(12) United States Patent
Cleyet et al.

(10) Patent No.: US 10,914,198 B2
(45) Date of Patent: Feb. 9, 2021

(54) TURBOMACHINE OIL TANK

(71) Applicant: Safran Aero Boosters SA, Herstel (BE)

(72) Inventors: Florian Cleyet, Liege (BE); Stephane Bougelet, Profondeville (BE)

(73) Assignee: SAFRAN AEROBOOSTERS SA, Herstal (BE)

( * ) Notice: Subject to any disclaimer, the term of this patent is extended or adjusted under 35 U.S.C. 154(b) by 132 days.

(21) Appl. No.: 15/727,796

(22) Filed: Oct. 9, 2017

(65) Prior Publication Data
US 2018/0128128 A1 May 10, 2018

(30) Foreign Application Priority Data

Oct. 13, 2016 (BE) .................................. 2016/5768

(51) Int. Cl.
| | |
|---|---|
| *F01D 25/28* | (2006.01) |
| *F01D 25/18* | (2006.01) |
| *F16N 19/00* | (2006.01) |
| *F02C 7/06* | (2006.01) |
| *B22F 3/105* | (2006.01) |
| *B33Y 80/00* | (2015.01) |
| *B22F 5/00* | (2006.01) |
| *F01M 11/00* | (2006.01) |

(52) U.S. Cl.
CPC ............ *F01D 25/28* (2013.01); *B22F 3/1055* (2013.01); *B22F 5/009* (2013.01); *B33Y 80/00* (2014.12); *F01D 25/18* (2013.01); *F02C 7/06* (2013.01); *F16N 19/00* (2013.01); *B22F 2301/15* (2013.01); *B22F 2301/205* (2013.01); *F01M 2011/0091* (2013.01); *F16N 2210/08* (2013.01)

(58) Field of Classification Search
CPC ........... F01D 25/18; F16N 19/00; B22F 5/009
See application file for complete search history.

(56) References Cited

U.S. PATENT DOCUMENTS

| | | | | | |
|---|---|---|---|---|---|
| 2,364,119 | A | * | 12/1944 | Anderson | B64D 37/22 96/187 |
| 2,604,188 | A | * | 7/1952 | Marchant | F01D 25/18 184/6.11 |
| 2,902,240 | A | * | 9/1959 | La Belle | B60K 15/067 248/201 |
| 3,027,971 | A | * | 4/1962 | Ketler, Jr. | F01D 25/18 184/6.13 |
| 3,771,287 | A | * | 11/1973 | Sunderland | B01D 19/00 96/187 |
| 4,197,870 | A | * | 4/1980 | Hildebrandt | B64D 33/00 137/43 |

(Continued)

*Primary Examiner* — Michael R Mansen
*Assistant Examiner* — Mark K Buse
(74) *Attorney, Agent, or Firm* — Sandberg Phoenix & von Gontard, P C.

(57) ABSTRACT

The invention relates to a turbojet engine oil tank (30). The tank (30) comprises a main chamber and an envelope (34) delimiting the main chamber, and a fixing portion (44) for example with fixing flanges (46) and a branch (48). The envelope (34) features in particular an envelope part (34) relative to which the fixing portion (44) projects. The envelope part (34) and the fixing portion (44) are produced by layered additive fabrication so as to be in one piece. The invention also relates to a method of fabricating an oil tank (30).

10 Claims, 4 Drawing Sheets

(56) References Cited

U.S. PATENT DOCUMENTS

| | | | | |
|---|---|---|---|---|
| 4,346,786 A * | 8/1982 | Midgley | ................ | F16N 29/02 184/6.2 |
| 4,377,933 A * | 3/1983 | Lojou | .................... | B64D 33/00 248/133 |
| 4,545,791 A * | 10/1985 | Schweikl | ............... | B64D 37/22 137/43 |
| 5,185,018 A * | 2/1993 | Zievers | ............. | B01D 39/2086 428/936 |
| 6,793,042 B2 * | 9/2004 | Brouillet | ................ | F01D 25/18 184/103.1 |
| 8,020,665 B2 * | 9/2011 | Sheridan | ................ | F01D 25/18 184/6.12 |
| 8,201,664 B2 * | 6/2012 | Brouillet | ............... | F01D 25/20 184/6.24 |
| 8,366,809 B2 * | 2/2013 | Rollins | .............. | B01D 19/0057 184/6.23 |
| 8,985,278 B2 * | 3/2015 | Xu | .......................... | F01D 25/18 184/6.11 |
| 9,951,655 B2 * | 4/2018 | Davis | ...................... | F01D 25/18 |
| 2007/0125087 A1 * | 6/2007 | Callaghan | ............. | F01D 21/045 60/772 |
| 2009/0014447 A1 * | 1/2009 | Horn | .................... | A01C 15/006 220/324 |
| 2010/0019505 A1 * | 1/2010 | Frost | ........................ | F02C 7/32 290/1 A |
| 2013/0174814 A1 * | 7/2013 | Sugiyama | ........ | F02M 35/10216 123/525 |
| 2013/0180994 A1 * | 7/2013 | Keefer | .................... | B29C 41/04 220/562 |
| 2013/0193150 A1 * | 8/2013 | Keefer | ................ | B65D 39/084 220/562 |
| 2015/0202548 A1 * | 7/2015 | Butt | ................... | B01D 19/0057 96/174 |
| 2015/0260563 A1 * | 9/2015 | Venter | .................. | F16N 19/003 73/304 C |
| 2016/0076399 A1 * | 3/2016 | Beier | ...................... | F16N 19/00 184/6.11 |
| 2016/0273696 A1 * | 9/2016 | Gonzalez Bayon | ... | A61K 8/895 |
| 2018/0104893 A1 * | 4/2018 | Bougelet | .............. | B22F 5/10 |
| 2018/0321073 A1 * | 11/2018 | Cleyet | .................... | G01F 23/22 |

* cited by examiner

TURBOMACHINE OIL TANK

TECHNICAL FIELD

The invention concerns the fabrication of a turbomachine tank. To be more precise, the invention addresses the fabrication of a metal tank for turbojet engine oil. The invention also relates to an axial turbomachine, notably an aircraft turbojet engine or an aircraft turboprop engine. The invention also proposes a method of fabrication of a tank.

PRIOR ART

The lubrication of a turbojet engine relies on the continuous circulation of oil. That oil follows a dedicated network that is connected to a tank that is specific to the turbojet engine. That tank forms both the starting point and the end point of the network. Moreover, it offers a buffer volume that compensates an accumulation of oil in certain zones, likewise oil consumption. Of course, the tank must remain fixed to the turbojet engine despite its level of filling and vibrations.

For what it is worth, it has to be remembered that the oil in a turbojet engine reaches 180° C., and even 230° C. in some scenarios. To address these constraints, the tank and likewise the circuit must be designed to resist these attacks in the long term. Moreover, the oil has corrosive properties, notably because of the presence of additives that are indispensable in a turbojet engine. The document FR 2 485 630 A1 discloses a turbojet engine with a casing supporting an oil tank with an antivibration system. A shaft connected to thickened portions of the envelope crosses the envelope of the tank. The ends of the shaft that exit the envelope form fixing members in flexible interengagement with the supporting casing of the turbojet engine. The shaft forms a hollow body with machined collars in contact with the thickened portions of the envelope. Additionally, a series of parallel internal partitions are connected to the shaft to reinforce the envelope. A tank of this kind actually exhibits some resistance to vibration but remains open to improvement.

SUMMARY OF INVENTION

Technical Problem

The objective of the invention is to solve at least one of the problems that arise in the prior art. To be more precise, the object of the invention is to improve the resistance to vibration of a turbojet engine oil tank. Another object of the invention is to propose a solution that is simple, light in weight, economical, reliable, compact and easy to inspect.

Technical Solution

The invention consists in an oil tank for a turbojet engine, the tank comprising a main chamber, an envelope delimiting the main chamber, and a fixing portion; the envelope comprising an envelope part relative to which the fixing portion projects, notably towards the exterior; noteworthy in that the envelope part and the fixing portion are produced by layered additive fabrication so as to be in one piece.

According to particular embodiments, the tank can have one or more of the following features, separately or in any technically possible combination:

The fixing portion comprises a first fixing flange projecting relative to the partition and possibly a second fixing flange projecting relative to the envelope, the envelope optionally comprising a base forming an increased thickness on the envelope part of the envelope at the level of at least one or each flange.

The envelope features a thinner first zone between the two fixing flanges and/or opposite the two fixing flanges.

At least one or each of the two fixing flanges comprises a curved free edge.

At least one or each des of the two fixing flanges has a triangular, possibly asymmetrical shape.

The tank comprises an internal stiffener extending the fixing portion, notably a fixing flange, toward the chamber; said internal stiffener, the envelope part and the fixing portion being produced by additive fabrication so as to be in one piece.

The envelope has an end with a second thinner zone, said end possibly being a lower end of the tank.

The envelope comprises a reinforcing belt or a reinforcing belt portion, the reinforcing belt or the reinforcing belt portion, the envelope part and the fixing portion are produced by additive fabrication so as to be in one piece.

The tank comprises at least one equipment such as a vent and/or a de-aerator and/or a probe support and/or a strainer; each equipment, the envelope part and the fixing portion being produced by additive fabrication so as to be in one piece.

The envelope part is a first envelope part, the envelope further comprising a second envelope part produced by layered additive fabrication and welded to the first envelope part by a weld.

The main chamber features a principal elongation, the weld being generally perpendicular to said principal elongation.

The first envelope part forms a bottom of the tank and/or the second envelope part forms a lid of the tank.

The envelope comprises a face where the fixing portion is disposed and a thinner portion opposite said face.

The main chamber has a cylindrical, possibly curved, general shape.

At least one or each of the two flanges is joined to the reinforcing belt or to the reinforcing belt portion.

At least one or each of the two flanges is a plate, notably of the same material as the envelope.

The stiffener comprises a mesh occupying all of the main chamber.

The stiffener crosses the internal chamber, possibly horizontally.

The envelope comprises two zones of increased thickness each of which is at the base of a fixing flange and a third zone of reduced thickness separating said two zones of increased thickness.

The envelope is made of metal, for example of steel.

The minimum thickness of the envelope can represent less than 75%, or less than 50%, or less than 25% of its maximum thickness. The maximum thickness can be measured outside of the equipments, the flanges, the branch, the stiffener and where applicable the belt.

The fixing portion is a first fixing portion produced in one piece with the first envelope part by additive fabrication and the tank further comprises a second fixing portion, for example with the branch, which is produced in one piece with the thickened envelope part by additive fabrication.

The invention also consists in a turbojet engine oil tank; the tank comprising a principal interior chamber, an envelope that delimits the main chamber, an external fixing portion, and an internal stiffener extending the fixing portion in the main chamber; noteworthy in that the envelope comprises a junction produced by additive fabrication so that the fixing portion, the envelope and the stiffener are in one piece.

The invention also consists in a turbojet engine comprising a supporting casing and an oil tank with a fixing portion fixed to the supporting casing, noteworthy in that the oil tank is according to the invention, the turbojet engine preferably comprises an oil circuit with a bearing and/or a heat exchanger, said oil circuit communicating with said oil tank.

According to an advantageous embodiment of the invention, the supporting casing comprises fixing means fixed to the fixing portion isostatically.

The invention also consists in a method of fabricating a turbojet engine oil tank, the method comprising a step: (a) of design of an oil tank with a main chamber, an envelope delimiting the main chamber, and a fixing portion; the envelope comprising a part from which the fixing portion projects outwards; noteworthy in that it further comprises a step (b) of layered additive fabrication of the envelope part and the fixing portion so as to be in one piece, the tank possibly conforming to the invention.

According to particular embodiments the method may have one or more of the following features separately or in any technically possible combination:
- During the additive fabrication step (b) the envelope part is produced sector by sector including a first sector with a concave surface and a second sector with a convex surface; during the additive fabrication step (b) the convex surface is fabricated in the concave surface.
- During the additive fabrication step (b) the two envelope sectors are stacked in the direction of their thicknesses.
- During the additive fabrication step (b) the two envelope sectors are spaced from one another in the direction of their thicknesses.
- During the additive fabrication step (b) the convex surface espouses the concave surface.
- The concave surface defines an internal volume in which the convex surface is fabricated during the additive fabrication step (b).
- The envelope comprises a third part, possibly formed by a metal plate of constant thickness welded to another envelope part.
- The method comprises a step (c) of welding the parts to one another.
- The layered additive fabrication is based on powder, for example titanium or Inconel powder.
- The third part is welded between the first envelope part and the second envelope part.

The advantageous embodiments of each object of the invention are generally equally applicable to the other objects of the invention. As far as possible, each object of the invention is combinable with the other objects. The objects of the invention are also combinable with the embodiments of the description, which are moreover combinable with one another.

Resulting Advantages

The invention makes it possible to link the fixings with the envelope thanks to a continuity of homogeneous material. This homogeneity of material improves the durability of the tank and favours the transmission of forces from the envelope to the fixing portions. This being so, the latter participate in reinforcing the envelope whilst preserving some elasticity. This aspect is further improved when the stiffeners extend the fixing portions inwards.

DESCRIPTION OF EMBODIMENTS

The directions referred to in the following description correspond to the normal assembly direction. The interior of the tank refers to its chamber and the exterior to its environment.

Figure 1:
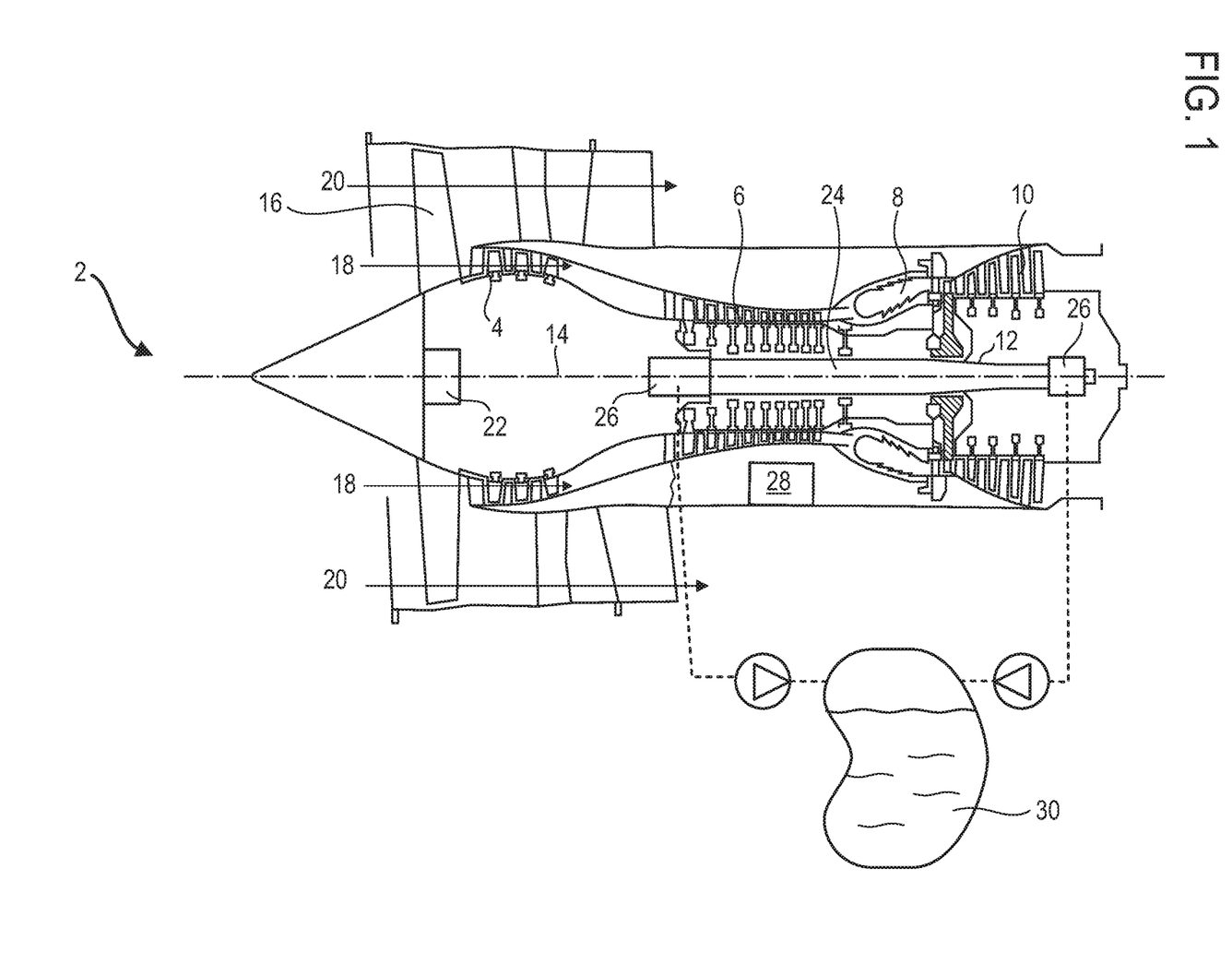
FIG. 1 shows a turbojet engine according to the invention.

FIG. 1 is a simplified representation of an axial turbomachine. In this specific instance this is a turbofan. The turbojet engine 2 comprises a first compression stage, termed the low-pressure compressor 4, a second compression stage, termed the high-pressure compressor 6, a combustion chamber 8 and one or more turbine stages 10. In operation, the mechanical power of the turbines 10 transmitted via shafts 24 to the rotor 12 drives the two compressors 4 and 6. The latter include a plurality of rows of rotor blades associated with rows of stator blades. The rotation of the rotor about its rotation axis 14 therefore makes it possible to generate a flow of air and to compress the latter progressively up to the point of entry into the combustion chamber 8.

An inlet fan 16 commonly referred to as a blower is coupled to the rotor 12. It generates an air flow that is divided into a primary flow 18 and a secondary flow 20 through an annular duct. An epicyclic gear 22 can reduce the rotation speed(s) of the blower 16 and/or of the low-pressure compressor 4 relative to the associated turbine 10.

The rotor 12 includes a plurality of concentric shafts 24 that are articulated in a rotary manner via bearings 26. Cooling and/or lubrication are provided by an oil circuit. That circuit can be specific to the turbojet engine 2. The oil circuit can also comprise a heat exchanger 28 for cooling the oil, the temperature of which can exceed 200° C. and even 230° C. in some cases. These temperatures make the corrosive oil more aggressive to the seals and to polymer parts in general. Here the position and the orientation of the tank 30 are purely illustrative. In practice, this tank 30 can be fixed to the casing of the turbojet engine 2. For example, it can be connected to the casing of the blower 16, to the casing of the low-pressure compressor 4 or to the casing of the high-pressure compressor 6. Such installation tends to add thermal stresses and direct exposure to the vibrations of the turbojet engine, notably in the event of loss of a blower blade.

Figure 2:
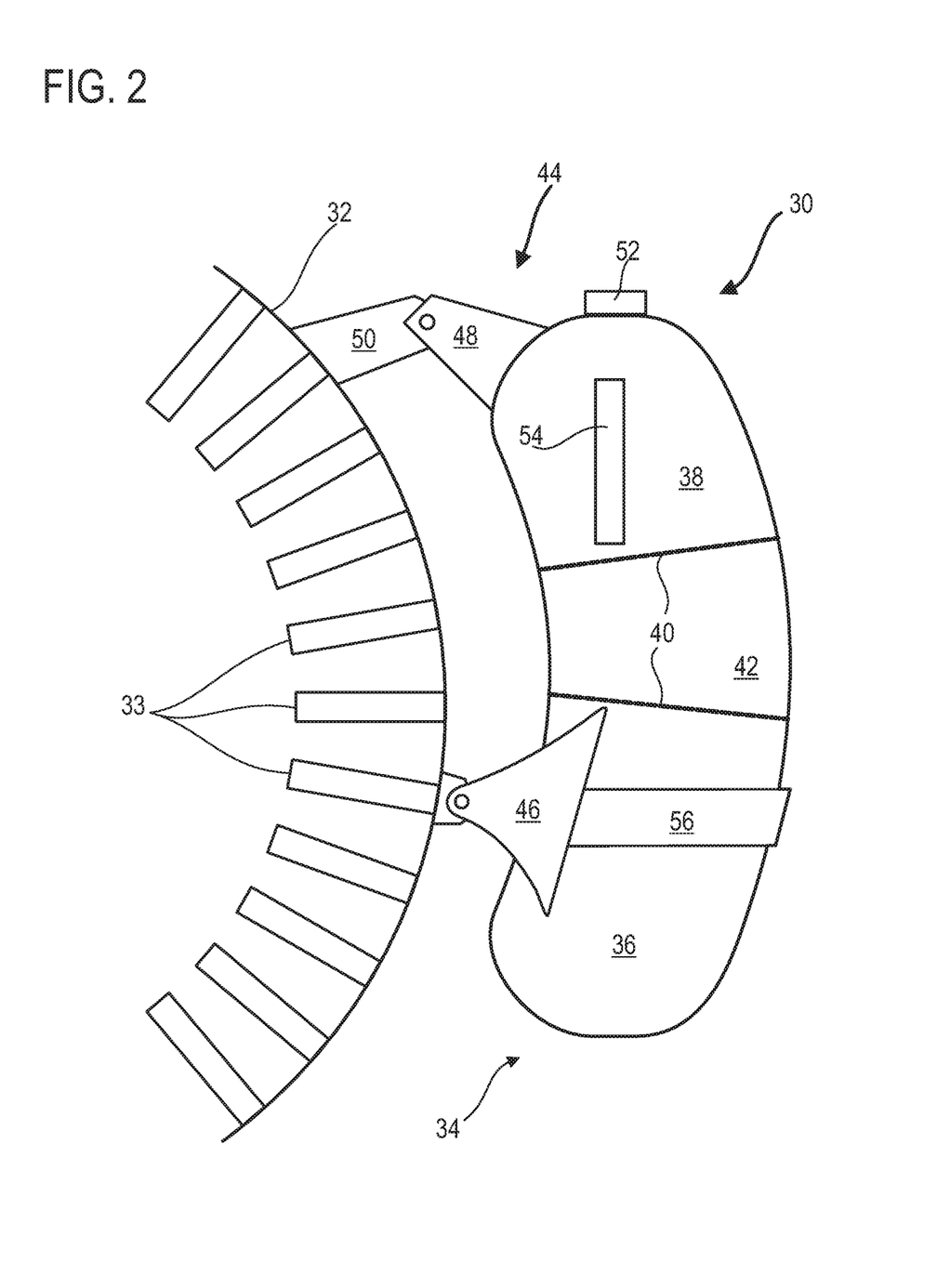
FIG. 2 is a sketch of a turbojet engine casing supporting a tank according to the invention.

FIG. 2 shows the fixing of the oil tank 30 to a supporting casing 32 of the turbojet engine. In this instance this can be the casing 32 of the low-pressure compressor that also supports an annular row of concentric blades 33. The turbojet engine can be that from FIG. 1.

In order to increase its usable volume, the tank 30 is essentially elongate whilst espousing the exterior curvature of the supporting casing 32. This compactness enables installation between two closely spaced tubular walls. In operation, the tank 30 is partially filled with oil, or to be more precise with a mixture of oil, air and impurities, such as abrasive metal particles released through wear.

The tank 30 features an envelope 34 with for example a lower part 36 or first part 36 and an upper part 38 or second part 38. These parts (36; 38) can be connected by a weld 40 or via a central part 42 of the envelope 34, also called the third part 42, which connects the lower part 36 to the upper part 38 via the welds 40. Each weld 40 can form a closed loop around the general lengthwise axis of the tank. Thanks to its parts (36; 38; 42), the envelope 34, a true skin, defines a main chamber (not visible) forming an oil storage volume. The chamber is an internal chamber intended to be filled. The description of the main chamber as "principal" is to be understood in the sense that it is the largest receptacle of the tank 30.

Regarding mounting on the supporting casing 32, the tank 30 features a fixing portion 44 projecting relative to the envelope 34, for example toward the casing 32. This fixing portion 44 can comprise one or at least two fixing flanges 46 (a flange that is visible conceals the other one). These flanges 46 can be secured to the lower part 36. The flanges 46 can be connected to thicker portions of the casing 32 forming reinforced and separated bases. The upper part 38 can feature a fixing branch 48, for example connected to the casing 32 via an arm and ball joint 50. The branch 48 and the fixing flanges 46 can be connected to the casing 32 so as to enable isostatic fixing. In other words they respectively and uniquely eliminate one, two and three degrees of freedom when they are fixed to the complementary fixing means of the casing 32. The six degrees of freedom of the tank are therefore fixed. This tends to reduce the effects of expansion and limits internal stresses.

The tank 30 can comprise other equipments. For example, it can comprise inlet and outlet orifices (not shown). A stopper 52 can be placed in the upper part 38, for example at its top. A level viewing window 54 can be formed in the upper part 38. A deserter, a vent and/or a de-oiler (not shown) can be associated with the tank 30.

The tank 30 is advantageously produced by additive fabrication, at least in part. For example at least one part, such as the first part 36 and possibly the second part 38, are produced separately by additive fabrication. They could be produced together in order to be in one piece. The third part 42 is optionally produced by additive fabrication. Alternatively, it is formed of rolled sheet metal, for example of constant thickness. Its thickness can be less than the thickness of the envelope 34 in the first and second parts. The thickness of the envelope 34 can vary between 2 mm and 0.5 mm or from 1.5 mm to 1 mm.

Moreover, the fixing flanges 46 can be in one piece with the lower part 36 of the envelope 34 and in particular produced by additive fabrication with the envelope 34 in order to improve the connection between each flange and the envelope 34. The addition of connecting spokes there further increases the transmission of forces and reduces the risk of fatigue cracks appearing. The tank 30 optionally features a belt 56 on the outside. The latter connects the flanges 46 and forms a localized increased thickness on the envelope 34.

Each fixing flange 46 can be generally triangular. The sides facing the casing 32, i.e. toward the concavity of the curved shape of the tank 30, can be curved. This makes them more slender and enables them to be lengthened at the same time as preserving their lightness. Moreover, the fixing ends of the fixing portion 44 are spaced from one another in order to increase the stability of the tank 30.

Figure 3:
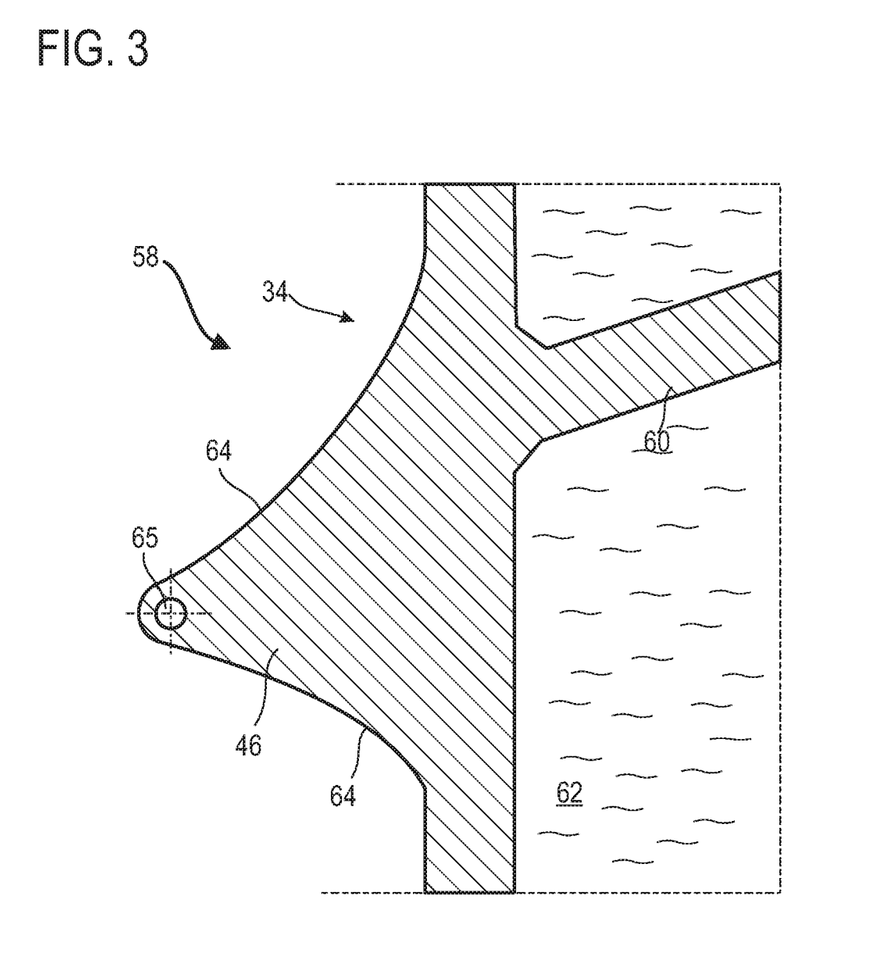
FIG. 3 shows an oil tank envelope junction conforming to the invention.

FIG. 3 shows in section a zone in which the envelope 34 forms a junction 58 that connects a fixing flange 46 to an internal stiffener 60 extending inside the main chamber 62. Although only one flange 46 is shown, the present teaching can be applied to each flange 46 of the tank.

The envelope 34 becomes an intermediary between the stiffener 60 and the flange 46 that extend away from one another. The concave sides 64 of the triangle that the flange 46 forms are shown; they can become tangents to the envelope 34. A fixing hole 65 can be seen in the flange 46.

Figure 4:
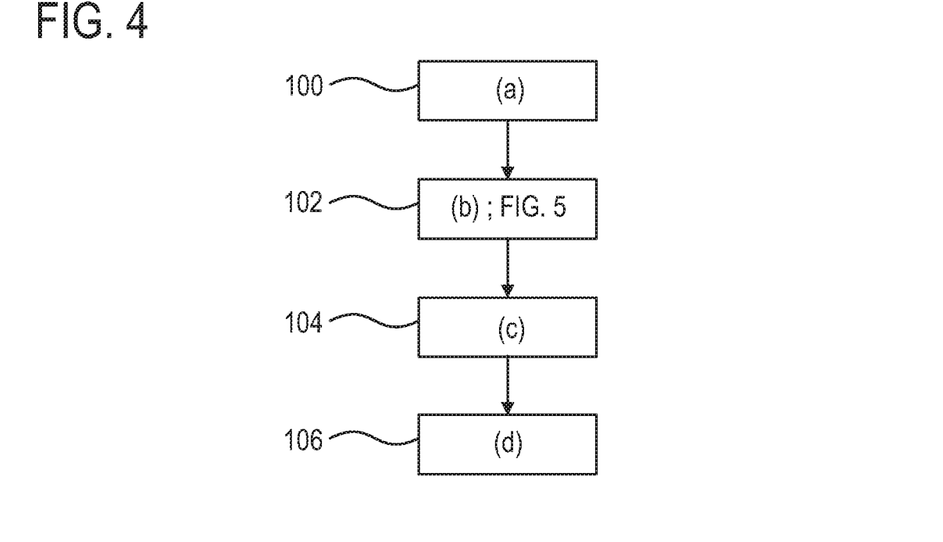
FIG. 4 is a diagram of the method of fabricating the oil tank according to the invention.

FIG. 4 is a diagram of the method of fabrication of an oil tank such as that shown in the previous figures.

The method may comprise the following steps, possibly carried out in the following order:

(a) design 100 of a turbojet engine oil tank allowing for a service life of at least 25 years and operating stresses;

(b) layered additive fabrication 102 based on powder of at least one, or at least two or each envelope part and the fixing portion;

(c) welding 104 the parts to one another;

(d) finishing 106 the tank, including sandblasting and treatment of the envelope; this finishing step (d) 106 remaining entirely optional.

During the design step (a) 100 the various sectors are defined. These can be angular sectors. Combining them can enable production of the first envelope part and/or the second envelope part.

The additive fabrication step (b) 102 can be one of fabrication by scanning a powder bed with an electron beam or a laser beam. The additive fabrication step (b) 102 is effected in a pocket on a mobile plate of a machine on which the powder bed is renewed and then precompacted before solidification of the various superposed layers. During this step the powder can be preheated, for example to 700° C. The raw powder can have a particle size of 20 μm.

Figure 5:
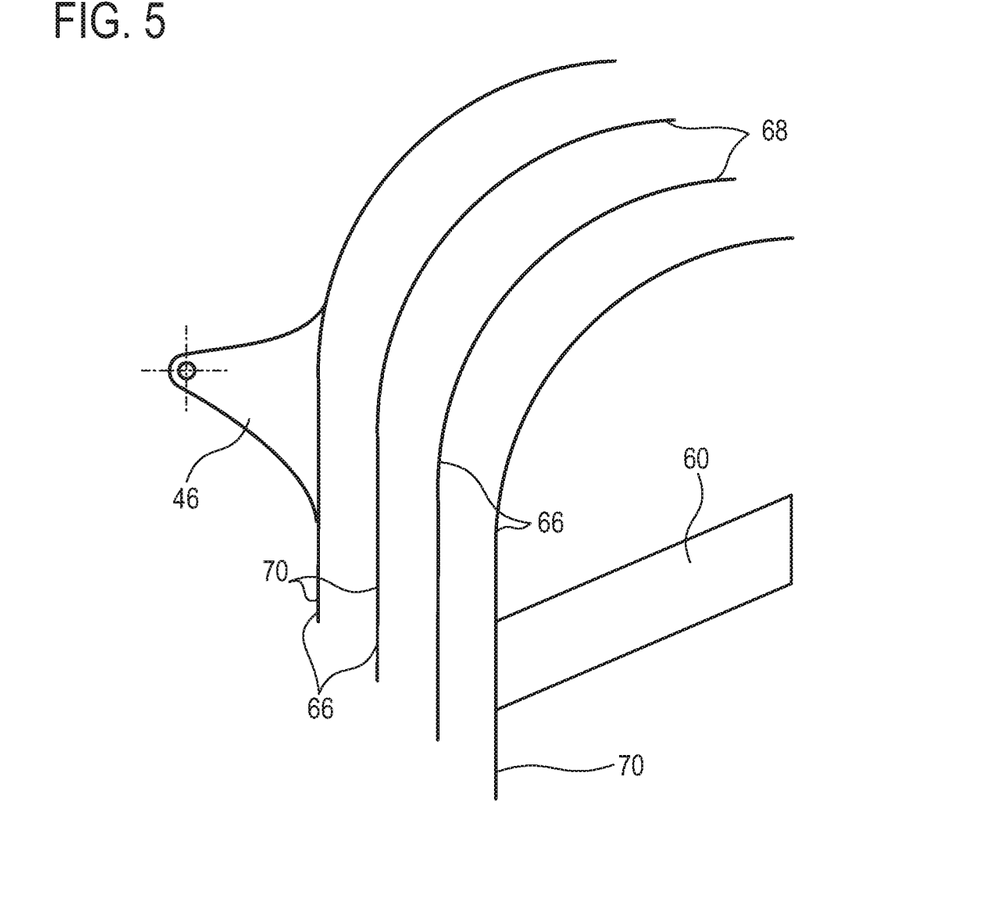
FIG. 5 shows a batch of envelope sectors produced by additive fabrication in accordance with the invention.

FIG. 5 is a sketch of an intermediate result of the additive fabrication step (c) of the method from FIG. 4. It shows a batch of envelope sectors 66 produced simultaneously in an additive fabrication machine. The sectors 66 are shown in section.

This batch forms a block the size of which optimizes the occupancy of the fabrication pocket of the additive fabrication machine in order to increase the production rate. In this block the sectors 66 are interleaved with one another. These sectors 66 have concave surfaces and convex surfaces. In order to improve compactness, the convex surfaces are in the concave surfaces and espouse one another. The flanges 46 and the stiffener 60 can be fabricated toward the exterior of the block.

The sectors 66 can be eighths of a sphere 68; where applicable with a vertical extension 70.

The invention claimed is:

1. An oil tank for a turbojet engine, the oil tank comprising a main chamber, an envelope delimiting the main chamber, and a fixing portion with at least one fixing flange; the envelope comprising an envelope part from which the at least one fixing flange projects towards the exterior of the main chamber; the envelope part and the at least one fixing flange being integrally formed,
the oil tank further comprising an internal stiffener extending in the chamber and aligned with the at least one fixing flange; wherein the internal stiffener, the envelope part and the fixing flange being integrally formed.

2. The oil tank in accordance with claim 1, wherein the envelope is thinner between the two fixing flanges.

3. The oil tank in accordance with claim 1, wherein at least one or each of the two fixing flanges comprises a curved free edge.

4. The oil tank in accordance with claim 1, wherein at least one or each of the two fixing flanges has a triangular shape.

5. The oil tank in accordance with claim 1, wherein the envelope comprises a reinforcing belt or a reinforcing belt portion, the reinforcing belt or the reinforcing belt portion, the envelope part and the fixing portion are integrally produced.

6. The oil tank in accordance with claim 1, wherein the envelope part is a first envelope part, the envelope further comprising a second envelope part produced by layered additive fabrication and welded to the first envelope part by a weld.

7. The oil tank in accordance with claim 6, wherein the main chamber features a principal elongation, the weld being generally perpendicular to said principal elongation.

8. The oil tank in accordance with claim 6, wherein the first envelope part forms a bottom of the oil tank.

9. A method of fabricating an oil tank of a turbojet engine, the oil tank comprising a main chamber, an envelope delimiting the main chamber, and a fixing portion with at least one fixing flange; the envelope comprising an envelope part from which the at least one fixing flange projects towards the exterior of the main chamber; the envelope part and the at least one fixing flange being integrally formed, the oil tank further comprising an internal stiffener extending in the chamber and aligned with the at least one fixing flange; wherein the internal stiffener, the envelope part and the fixing flange are integrally formed, the method comprising the steps:

designing the oil tank with the main chamber, the envelope delimiting the main chamber, the internal stiffener and the fixing portion; and manufacturing the envelope, the internal stiffener and the fixing portion with an additive layer manufacturing step.

10. The method according to claim 9, wherein the additive layer manufacturing step is based on titanium powder.

* * * * *

UNITED STATES PATENT AND TRADEMARK OFFICE
CERTIFICATE OF CORRECTION

| | |
|---|---|
| PATENT NO. | : 10,914,198 B2 |
| APPLICATION NO. | : 15/727796 |
| DATED | : February 9, 2021 |
| INVENTOR(S) | : Florian Cleyet and Stephane Bougelet |

It is certified that error appears in the above-identified patent and that said Letters Patent is hereby corrected as shown below:

On the Title Page

At item (73) Assignee: replace "SAFRAN AEROBOOSTERS SA, Herstal (BE)" with --SAFRAN AERO BOOSTERS SA, Herstal (BE)--

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*